United States Patent
Kröll et al.

(10) Patent No.: US 7,365,101 B2
(45) Date of Patent: Apr. 29, 2008

(54) DISPERSION OF PYROGENICALLY PRODUCED CERIUM OXIDE

(75) Inventors: Michael Kröll, Geinhausen (DE);
Günther Michael, Karlstein (DE);
Rainer Hahn, Büdingen (DE); Stipan Katusic, Kelkheim (DE); Stefan Heberer, Gelnhausen (DE); Ralph Brandes, Princeton, NJ (US)

(73) Assignee: Degussa AG, Dusseldorf (DE)

( * ) Notice: Subject to any disclaimer, the term of this patent is extended or adjusted under 35 U.S.C. 154(b) by 338 days.

(21) Appl. No.: 10/941,650

(22) Filed: Sep. 15, 2004

(65) Prior Publication Data
US 2005/0074610 A1    Apr. 7, 2005

(30) Foreign Application Priority Data
Sep. 17, 2003    (DE) .................. 103 42 826

(51) Int. Cl.
*B01F 3/12* (2006.01)
*C09K 3/14* (2006.01)
*C09C 1/68* (2006.01)
*C01F 17/00* (2006.01)

(52) U.S. Cl. .............. 516/89; 51/309; 106/3
(58) Field of Classification Search ........... 516/89; 428/402; 51/309; 106/3
See application file for complete search history.

(56) References Cited

U.S. PATENT DOCUMENTS

| | | | | |
|---|---|---|---|---|
| 3,836,395 | A | * | 9/1974 | Roller et al. ............. 427/548 |
| 3,957,210 | A | * | 5/1976 | Durr .................... 241/46.02 |
| 6,710,366 | B1 | * | 3/2004 | Lee et al. ................ 257/14 |
| 6,887,566 | B1 | * | 5/2005 | Hung et al. ............. 428/357 |
| 2004/0029978 | A1 | * | 2/2004 | Chane-Ching ............ 516/9 |
| 2005/0224749 | A1 | * | 10/2005 | Lortz et al. ........... 252/182.11 |

FOREIGN PATENT DOCUMENTS

| | | |
|---|---|---|
| DE | 102 25 125 A1 | 12/2003 |
| EP | 0 957 064 A1 | 11/1999 |
| WO | WO 01/36332 A1 * | 5/2001 |
| WO | WO 01/85324 A1 * | 11/2001 |
| WO | WO 02/40399 A2 | 5/2002 |
| WO | WO 03/103816 A2 | 12/2003 |

* cited by examiner

*Primary Examiner*—Daniel S. Metzmaier
(74) *Attorney, Agent, or Firm*—Robert G. Weilacher; Smith, Gambrell & Russell

(57) ABSTRACT

A dispersion of pyrogenically produced cerium oxide, which does not contain any particles larger than 1 µm, is produced by dispersing a pyrogenically produced cerium oxide in water by means of a dissolver, centrifuging it, separating the supernatant from the bottom product, and again dispersing the supernatant by means of ultrasound. The dispersion can be used for chemical-mechanical polishing (CMP).

1 Claim, 2 Drawing Sheets

DISPERSION OF PYROGENICALLY PRODUCED CERIUM OXIDE

INTRODUCTION AND BACKGROUND

The present invention relates to a dispersion of pyrogenically produced cerium oxide, a method for producing it, and its use.

Dispersing cerium oxide in water is known in the art (EP 0 957 064 A1).

In addition, dispersing pyrogenic cerium oxide in a mixture of water and a base, where the pH of the dispersion is greater than 8, is known from WO 02/40399.

These dispersions can have a solids content up to 40 wt %. High shear mixers can be used to produce the dispersion, with a shear rate of at least $10^2$ $sec^{-1}$ being used.

The resulting known dispersion can have a service life of more than 7 days at 25° C. and can be used in chemical-mechanical polishing (CMP). To remove grit or particles that exceed a certain size the known dispersion of pyrogenic cerium oxide can be passed through a filter. Very fine filters can also be used in this case, and for which the dispersions should have a low viscosity.

WO 02/40399 does not describe a specific example of an aqueous dispersion of pyrogenic cerium oxide. Furthermore, nothing is said about the average primary particles or the average aggregate size of the cerium oxide. WO 02/40399 also does not give an example in which the filtration of an aqueous dispersion of pyrogenic cerium oxide is carried out.

Experiments by the applicants have shown that an aqueous dispersion of pyrogenic cerium oxide that contains fine particles cannot be filtered. Plugging of the filter develops spontaneously, since a three-dimensional network is formed because of the thixotropic structure of the pyrogenic cerium oxide. Thus, separation of an aqueous dispersion of pyrogenic cerium oxide from coarser particles that are larger than 1 μm is not known in the prior art.

SUMMARY OF THE INVENTION

It is desired to produce a dispersion of pyrogenic cerium oxide that does not have any secondary particles larger than 1 μm.

The present invention provides a dispersion of pyrogenic cerium oxide that is characterized by the fact that it does not have any cerium oxide particles with a particle size greater than 1 μm. This means that 100% of the secondary particles are smaller than 1 μm.

In a preferred embodiment the dispersion of the secondary particles can be 100% smaller than 400 nm, especially 100% smaller than 400 nm, with $d_{90}$ smaller than 200 nm and $d_{50} \approx 100$ nm.

The present invention also provides a method for producing a dispersion of pyrogenic cerium oxide that is characterized by the fact that pyrogenic cerium oxide is dispersed in water by means of a dissolver, this dispersion is dispersed by means of ultrasound and is centrifuged, the supernatant is separated from the bottom product, and the supernatant is again dispersed by means of ultrasound.

A cerium oxide that has the following physical-chemical characteristics is used as pyrogenically produced cerium oxide:

| BET surface | $m^2/g$ | 1-200 |
|---|---|---|
| Average size of primary particles | nm | 2-40 |
| Compacted bulk density | g/L | 50-500 |
| $CeO_2$ content, ICP | % | >=98.6 |

Preferably a cerium oxide that has the following physical-chemical characteristics is used:

| BET surface | $m^2/g$ | 90 ± 15 |
|---|---|---|
| Average size of primary particles | nm | 9 |
| Compacted bulk density | g/L | approximately 100 |
| $CeO_2$ content, ICP | % | >=99.8 |

The dispersion of pyrogenic cerium oxide in accordance with the invention has the advantage that because of the absence of particles larger than 1 μm it does not produce any undesired scratches in chemical-mechanical polishing (CMP).

BRIEF DESCRIPTION OF DRAWING

The present invention will be further understood with reference to the accompanying drawing: wherein.

DETAILED EMBODIMENTS OF INVENTION

EXAMPLE

Figure 1:
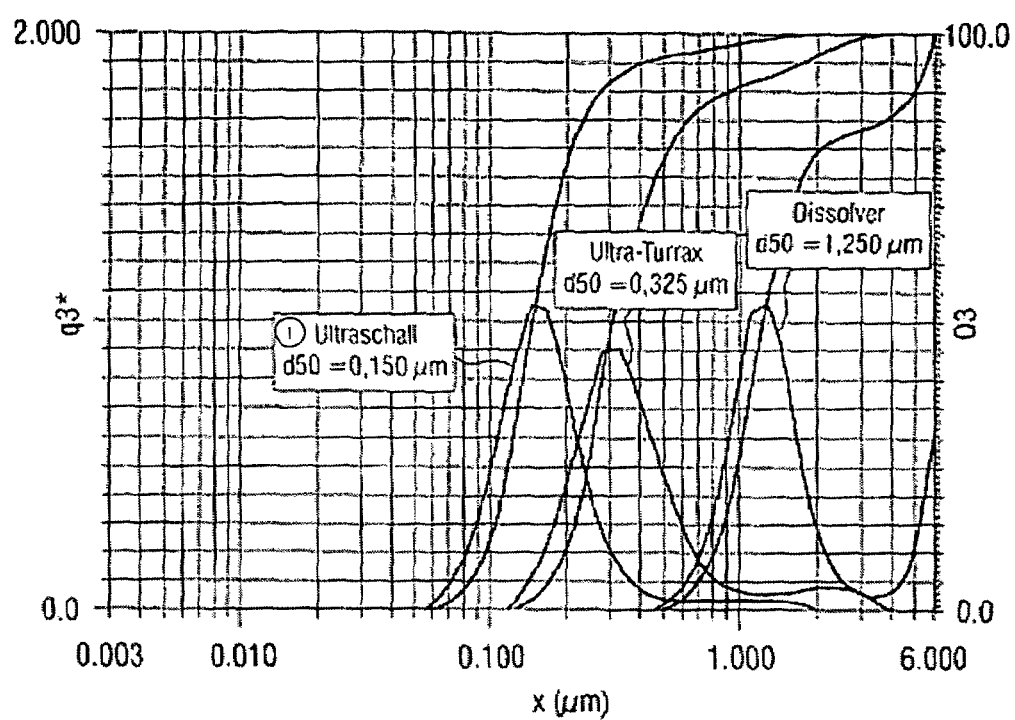
FIG. 1 represents the PCS curve for nanoscale pyrogenic cerium oxide dispersed in water as a function of the type of dispersions; namely, ultrasound, Ultra-Turrox and Dissolver.

A 5% dispersion of pyrogenic cerium oxide (AdNano $CeO_2$) in water is prepared.

The known dispersion method (successive increase of shear forces→Dissolver, Ultraturrax, ultrasound) does not lead to the desired goal of achieving a small particle diameter with a particle size distribution that is as small as possible.

On the other hand, a combination of ultrasound dispersion and centrifuging in accordance with the invention surprisingly leads to this desired result. The particle sizes or particle size distributions are determined by means of PCS (photon correlation spectroscopy).

Description of Method

A 5% (w/w) mixture of pyrogenic cerium oxide in water is first gently predispersed by means of a Dissolver. This dispersion is now dispersed by means of ultrasound and the particle size in the dispersion is measured. The dispersion is centrifuged and the supernatant is separated from the bottom product. The particle size is redetermined. Then the supernatant is again dispersed by means of ultrasound and the average particle diameter is determined again.

The Dissolver, also called high-speed stirring disk apparatus, is a batch-process dispersion apparatus that is predominantly used for producing emulsion paint, simple house paints, etc. When producing high-quality paints and processing difficult to disperse pigments, the Dissolver is used for pre-dispersion (refer to paint production), so that the downstream stirring mills are able to achieve a higher dispersion power. In the simplest case, a Dissolver consists of a cylindrical vessel with smooth inside walls along the vertical axis of which the stirring shaft rotates at high velocity with a stirring disk that is fixed at it's end. Impact devices, such as teeth, fins and pins, are provided at the edge of the stirring disk. The regular Dissolver operates at controllable continuously-variable speeds (potentially with automatic speed control), has replaceable stirring disks, and can be advanced and retracted. They are available in capacities ranging between 40 and 200 hp (30-150 kW).

In the Dissolver the agglomerate is dispersed by means of shear fields in the vicinity of the disk and by the change in pressure which is created in the material to be ground due to high and lower pressures occurring between the adjacent zones.

The following parameters influence the dispersion result: The correct flow of the material to be ground; the geometric dimensions of the vessel and the disk; the rotational speed (speed of the stirring shaft) of the stirrer.

If the viscosity of the material to be ground is adjusted correctly, a suction cone extending down to the disk is created when operating the Dissolver without developing standing peripheral zones. The diameter d of the disk is to be one half to one third of the vessel diameter, and the stirring disk must be spaced ½ d from the base of the vessel so that a shear gradient can become active beneath the stirring disk. The filling height is to be between 1 and 2 d. The last parameter is the peripheral speed of the Dissolver disk (speed at one point on the edge of the disk), which is to be at least 20 m/s and is achieved by suitable selection of the speed n (rpm) of the stirring shaft. The speed can be calculated according to the formula $$n = \frac{v \cdot 60}{\pi \cdot d}$$

where v=peripheral speed (m/s) and d=diameter of the disk (m). Apart from the simple Dissolvers, there are twin shaft Dissolvers with two adjacent stirring disks offset in height, and Dissolver mixers with pivotable and lowerable stirring elements.

Measurement Method

Photon correlation spectroscopy (PCS) is used as the method to determine the particle size. This method is based on the size-dependent scattering of monochromatic light, where multiple scattering processes, which can arise in turbid dispersions, must be excluded.

FIG. 1 shows the PCS curves for nanoscale pyrogenic cerium oxide dispersed in water as a function of the type of dispersion. As can be clearly seen, the average particle diameter decreases with increasing dispersion intensity (ultrasound>Ultraturrax>dissolver).

The $d_{50}$ value decreases from the original 1250 nm (dissolver) to the end 150 nm (ultrasound). However, it is striking that a significant number of particles have particle diameters greater than 1 µm. However, the dispersion that is used must not contain coarser particles in particular in chemical-mechanical polishing (CMP), which is a primary area for use of nanoscale pyrogenically produced cerium oxide, since such dispersions are then not fit for use in CMP.

However, if the dispersion method is changed to the extent that the dispersion of pyrogenic cerium oxide is first gently predispersed by means of a dissolver, then dispersed by means of ultrasound, then the coarse material is separated by centrifuging, and the dispersion is again dispersed by means of ultrasound, not only does one succeed in reducing the $d_{50}$ value significantly ($d_{50} \approx 100$ nm), but also in removing the coarse material completely. This shows up in a $d_{90}$ value smaller than 200 nm (secondary particles).

Figure 2:
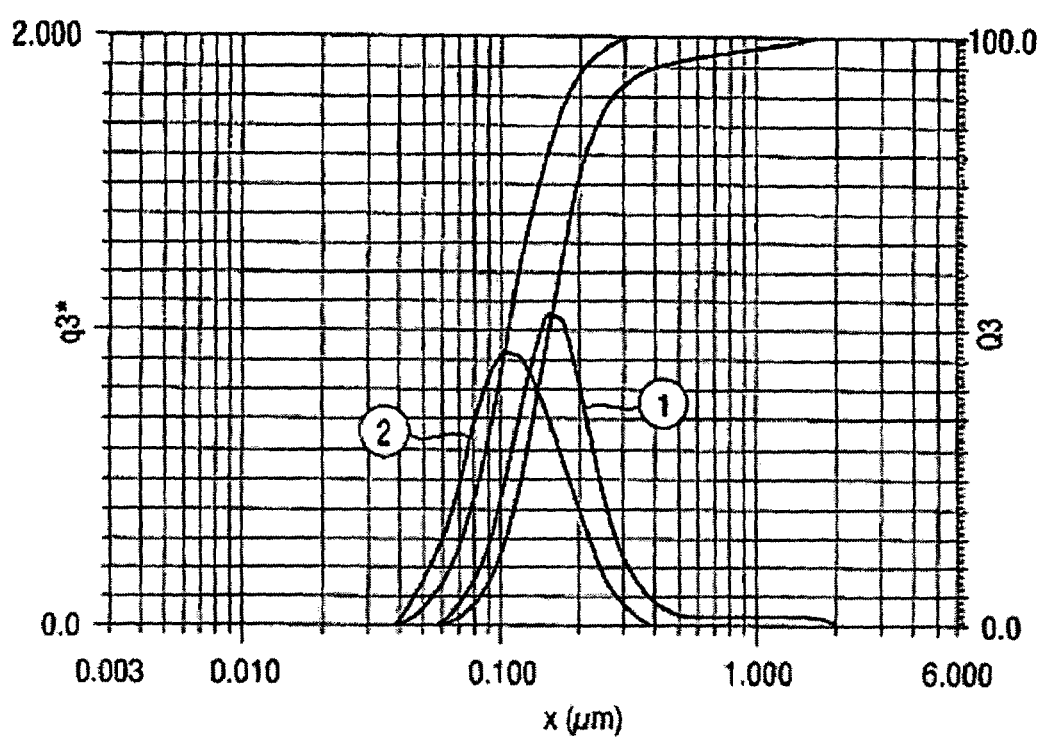
FIG. 2 is a representation of PCS curves for aqueous dispersion of nanoscale cerium oxide produced according to (1) conventional method, $d_{50}=150_{nm}$ and for (2) dispersions produced by the present invention, $d_{50}=106_{nm}$.

The PCR curves for aqueous cerium oxide dispersions prepared by the known methods and by the method developed in accordance with the invention are compared in FIG. 2. One can clearly see that on the one hand the particle size distribution shifts towards smaller particles and on the other hand the coarse material fraction was completely removed. Both results are of particular importance for the use of the nanoscale cerium oxide in CMP.

In principal, all tests are performed at room temperature. The Dissolver (LR 34, Pendraulik) is run for 5 min at 2000 rpm. The Ultra-Turrax (T25 Basic, IKA) is run for 4 min at 10000 rpm. The ultrasonic finger (Dr. Hielscher, UP400S) also is run for 4 min at 80% of its max. capacity (400 W).

The advantages of the aqueous dispersion of pyrogenic cerium oxide in accordance with the invention are the narrow particle size distribution (secondary particles), the small average particle diameter (secondary particles) and the resulting suitability for use in the field of CMP or in the polishing of glass. Besides the use as a polishing agent in CMP, the aqueous dispersion of pyrogenic cerium oxide in accordance with the invention can be used in catalysis.

Further variations and modifications of the foregoing will be apparent to those skilled in the art and are intended to be encompassed by the claims appended hereto.

German prior application 103 46 826.7 of Sep. 17, 2003, is relied on and incorporated herein by reference.

What is claimed is:

1. A method for producing a dispersion of pyrogenically produced cerium oxide, comprising dispersing pyrogenically produced cerium oxide in water by means of a dissolver to obtain a first dispersion, dispersing the first dispersion by means of ultrasound and centrifugation to obtain a supernatant and a bottom product, separating the supernatant from the bottom product, and dispersing the supernatant again by ultrasound to obtain the said dispersion containing primary and secondary particles, which is characterized by said dispersion not having any particles with a particle size greater than 1 µm and wherein 100% of secondary particles are smaller than 1 µm.

* * * * *